Patented Sept. 3, 1940

2,213,576

UNITED STATES PATENT OFFICE 2,213,576

ROAD SURFACING COMPOSITION

William R. Brison, Baytown, Tex., assignor to Standard Oil Development Company, a corporation of Delaware No Drawing. Application August 15, 1936, Serial No. 96,251

2 Claims. (Cl. 106—31)

This invention relates to a surfacing composition that is adapted to coat roads, pavements, garage floors, cellar floors or other surfaces where a coating is required that will withstand hard wear and remain dustless. The surfacing composition is particularly useful in parts of the country where mineral aggregate of the type that is used in laying bituminous or concrete pavements is not available.

Calcareous deposits such as oyster beds, are found in various parts of this country which heretofore could not be used to produce a good surface coating, for traffic in a short period of time readily pulverized these oyster shells which, when wet readily grooved with the result that the road became very uneven and rough.

An object of this invention is to produce a surfacing composition from the materials that are generally considered waste, which when used as a coating provides a surface which not only will withstand hard wear but will also be impervious to water and maintain an even, hard, dustless surface over a prolonged period of time.

In preparing this surfacing composition, one of the components used is the resinous materials that are found in petroleum oils. Most distillation products, especially the lubricating oil fractions, contain resinous material in amounts sufficient to give an undesirable yellowish to red color. The color is generally removed by contacting the petroleum distillation products with a decolorizing clay. The clays that are used for decoloring oils are clay-like minerals or clay-like rocks of porous or cellular structure and of high absorptive capacity in their natural state or after chemical or other treatment. A specific type of oil decolorizing clay is fuller's earth. Most of the fuller's earth mined at present in the United States is obtained from the States of Florida and Georgia which are known as Florida fuller's earth. Other oil decolorizing clays are those obtained in Texas, Oklahoma, Arizona, and Utah, and are called "neutralizing clays." Bentonite and related clays are also used for decoloring oil though they must be first chemically treated before being used.

Petroleum oil is freed of the color giving resinous material by contacting the oil and the clay either by mixing the oil and oil decolorizing clay or by filtering the oil through a body of oil decolorizing clay. This operation may be conducted on the distillation product either before or after acid treatment of same. When the oil is filtered through a body of clay, the first oil to pass through the clay is very light in color but the oil which follows gradually becomes darker. When the oil coming from the filter is no longer decolored to any substantial degree, the filtering is discontinued. Light naphtha is then pumped through the clay to remove the oil. The clay separated from the oil is dried either by steaming or roasting and used again to decolor oils. The clay after each treatment gradually loses its decolorizing power and finally cannot be used to decolor oil.

According to this invention the clay after it had been used to decolor an oil the last time is used in preparation of this coating composition. This invention applies particularly to spent decolorizing clay from contact operation. This contact operation may be applied to the oil or distillation products either before or after chemical treatment, the sweet or acid oil being thoroughly mixed in suitable equipment with a definite quantity of the decolorizing contact clay and subjected to the desired contacting temperature in the presence of definite quantities of superheated steam. The oil and clay blend, after a certain period of contact, is cooled to required temperature for pressing, or other method for removal of the clay. In this declaying step, provisions are made for the removal of whatever excess oil can be salvaged from the clay cake by air blowing. The clay dump from this operation is usually discarded and it is this material which it is proposed to use as one of the ingredients for the road coating composition as covered by this invention. It is mixed with an equal amount of calcareous material, for example, oyster shells, and the mixture laid and compacted by tamping or rolling with a heavy roller. The proportions of material may be varied, for example, 30 to 50% of spent clay with the resinous material absorbed therein and 70 to 50% of the calcareous material. The oyster shells need not be powdered or free of powdered material but only sufficiently graded so that the mixture is free of voids.

Absorbent clay may be taken and mixed with the resinous materials that had been separated from the clay. It is not necessary that all of the oil be removed as the mixture will readily compact even though small amounts of the oil are present. Other materials obtained by filtering petroleum oils are also present, for example, in filtering sulfuric acid treated petroleum oil sulfonic acid and some free sulfuric acid are separated by the clay. When naphthenic base oils are filtered naphthenic acids are also separated and found in the clay. All these materials when present do not weaken the finished coating material as they react with the calcareous material.

The surface of the coated material is extremely hard, resistant to wear and waterproof. The water runs off from the surface and the surface does not present a slippery or skiddy surface when wet. If it is desired to remove the surface coating this can readily be done by scarifying and breaking it up. This broken up mixture can be used again, that is laid and compacted by rerolling to form a new hard surface. The composition is likewise suitable as an anti-corrosive protecting cover for pipe lines.

Having thus described the invention it is not intended that it be limited by any of the specific examples but it is desired to claim all inherent novelty as broadly as the prior art permits.

I claim:

1. A road surfacing composition, comprising a substantially asphalt-free spent decolorizing clay impregnated with mineral oil resins obtained from the refining of petroleum oil mixed with calcareous material, the composition being free from added asphaltic constituents.

2. A composition of matter consisting of 30 to 50% of a substantially asphalt-free spent decolorizing clay impregnated with mineral oil resins obtained from the refining of petroleum oil and 70 to 50% oyster shell.

WILLIAM R. BRISON.